United States Patent Office 3,445,527
Patented May 20, 1969

3,445,527
STABILIZED CHLOROFLUOROALKANE COMPOSITION
Kazuo Okamura, Itami-shi, Japan, assignor to Daikin Kogyo Kabushiki Kaisha, Kita-ku, Osaka-shi, Japan, a juridical person of Japan
No Drawing. Filed Jan. 16, 1967, Ser. No. 609,360
Claims priority, application Japan, Jan. 21, 1966, 41/3,402; June 3, 1966, 41/35,935
Int. Cl. C07c *19/08*
U.S. Cl. 260—652.5      7 Claims

ABSTRACT OF THE DISCLOSURE

Chlorofluoroalkane based compositions containing trichlorofluoromethane, trichlorotrifluoroethanes or tetrachlorodifluoroethanes are stabilized against reaction with 85 to 95 volume percent hydrated alcohol having 1 to 4 carbon atoms by 0.1 to 5.0 weight percent of one or more epoxyethane compounds which are epoxyethane, 2-methyl-1,2-epoxyethane, 2-vinyl-1,2-epoxyethane and 2-methyl-2-vinyl-1,2-epoxyethane. The compositions may also contain nitromethane as an added stabilizer. Said compositions are particularly useful as aerosol compositions and solvent media for cleaning.

---

This invention relates to chlorofluoroalkane compositions, more particularly to chlorofluoroalkane compositions containing compounds which inhibit the reaction of chlorofluoroalkanes with hydrated alcohols.

In recent years compositions containing certain chlorofluoroalkanes and aliphatic alcohols have been widely used as aerosol formulations (e.g., hair spray), and solvent media for cleaning (e.g., degreasing, dewaxing).

However, when trichlorofluoromethane, trichlorotrifluoroethane or tetrachlorodifluoroethane is used, it is well known that such chlorofluoroalkanes reacts with alcohol, forming undesired products. For example, the reaction of trichlorofluoromethane with ethanol is as following:

$$CCl_3F + CH_3CH_2OH \rightarrow CHCl_2F + CH_3CHO + HCl$$

The product, acetaldehyde, emits a disagreeable odor and produces a colored and odoriferous condensation products, and hydrogen chloride is corrosive to metals, producing insoluble metallic salts and hydrogen. In aerosol formulations such products are harmful to the human body, and are objectionable for their disagreeable odor, coloration and corrosion of metallic containers. Further, in the cleaning formulations such products are also objectionable as well as harmful to the human body.

The problems discussed above are intensified particularly when 85–95 volume percent hydrated alcohol is used. For example, an aerosol product in which hydrated alcohol is used produces more objectionable odor, is more discolored and corrodes metallic containers more rapidly than an aerosol product made with anhydrous alcohol. The reason for the acceleration of such phenomena by the use of hydrated alcohol is not clear, but such is presumed to be due to the fact that chlorofluoroalkane not only reacts with alcohol but also produces acidic substances by hydrolysis reaction. This reasoning may be proved to some extent by the fact that the pH of a composition containing hydrated alcohol is reduced more rapidly and markedly than one containing anhydrous alcohol. However, since 85–95 volume percent hydrated alcohol is lower in cost than anhydrous alcohol and less stimulative to human skin, hydrated alcohol is more desirably useful for the preparation of the chlorofluoroalkane composition.

U.S. Patent No. 3,085,116 discloses that mononitroalkanes are effective in inhibiting the above reaction of chlorofluoroalkanes with anhydrous alcohols. In fact, when anhydrous alcohol is used, nitroalkanes effectively inhibit the above reaction, while when hydrated alcohol is used the effect is not so marked. Particularly, less than 0.1 weight percent of nitroalkane based on the weight of chlorofluoroalkane exhibits almost no inhibiting effect on the reaction of chlorofluoroalkane with hydrated alcohol. Furthermore, nitroalkanes are rather expensive compounds, and the use of larger amounts is not desirable from an economical view point, and the use of larger amounts is also undesirable because of increased discoloration which results from the action of sunlight and ultraviolet light rays on such compositions.

An object of the invention is to provide a chlorofluoroalkane composition which is stable even to hydrated aliphatic alcohol.

Another object of the invention is to provide inhibitors which effectively inhibit the reaction of chlorofluoroalkanes with hydrated aliphatic alcohols.

A further object of the invention is to provide a chlorofluoroalkane composition which is free for a long period of time from disagreeable odor and discoloration and the formation of substances harmful to the human body.

A further object of the invention is to provide a chlorofluoroalkane composition which is not discolored by the sun and ultraviolet rays and is economically advantageous.

The foregoing and other objects of the invention will be clear from the description to follow.

The above objects of the invention may be accomplished by a composition being stable to 85 to 95 volume percent hydrated aliphatic alcohol having 1 to 4 carbon atoms which comprises a chlorofluoroalkane of the group consisting of trichlorofluoromethane, trichlorotrifluoroethanes and tetrachlorodifluoroethanes and 0.1 to 5 weight percent of an epoxyethane compound of the group consisting of epoxyethane, 2-methyl-1,2-epoxyethane, 2-vinyl-1,2-epoxyethane and 2-methyl-2-vinyl-1,2-epoxyethane; or comprises said chlorofluoroalkane, 0.1 to 2.0 weight percent of said epoxyethane compound and 0.01–0.1 weight percent of nitromethane.

This invention is based on the discoveries that said epoxyethane compound effectively inhibits the reaction of chlorofluoroalkane with hydrated alcohol for a long period of time and that when the epoxyethane compound is mixed with such slight amounts of nitromethane which, alone, exhibit almost no inhibiting effect on the above reaction, the mixture exhibits high inhibiting effect due to a synergistic action which is not expected in view of the activities of each of these substances individually.

The epoxyethane compounds to be used according to the invention are epoxyethane

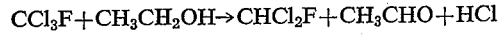

2-methyl-1,2-epoxyethane

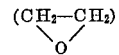

2-vinyl-1,2-epoxyethane

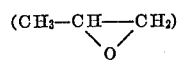

and 2-methyl-2-vinyl-1,2-epoxyethane

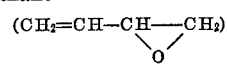

and most desirable is 2-methyl-1,2-epoxyethane. These compounds are nonacidic, volatile, nontoxic and low in cost, and are free from disagreeable odor and color and are noncorrosive to metals and other materials with which the compositions of the invention will be brought into contact. This epoxyethane compound is used at a rate of 0.1–5 weight percent, preferably 0.5–3 weight percent, based on the weight of chlorofluoroalkane, and the lower is the amount of the epoxyethane compound which is used, the lesser is the effect. Larger amounts of epoxyethane compound may be used but are unnecessary and tend to be uneconomical.

The above epoxyethane compound can singly inhibit the reaction of chlorofluoroalkane with hydrated alcohol, but by addition of a slight amount of nitromethane to the lower range of the amounts of epoxyethane compound which can be used, the inhibition of the above reaction is markedly increased. In this case, it is desirable to use 0.1–2.0 weight percent, preferably 0.5–1.5 weight percent, of epoxyethane compound and 0.01–0.1 weight percent, preferably 0.05–0.08 weight percent, of nitromethane based on the weight of chlorofluoroalkane. By the use of the above substances in the given range, a markedly synergistic effect is exhibited. While the presence of about 0.01–0.1 weight percent of nitromethane alone in chlorofluoroalkane can hardly inhibit the undesirable reaction of chlorofluoroalkane with hydrated alcohol, if a small amount of epoxyethane compound is used in combination with the above amount of nitromethane, a markedly higher inhibiting effect is exhibited over the single use of epoxyethane compound of the same amount, and as far as nitromethane is used within the above range, the composition of the invention is not discolored by the sun and ultraviolet rays, and has sufficient economical advantages. The use of a larger amount of nitromethane will lead to marked discoloration by the sun and ultraviolet rays and lowers economic features. A lower amount of nitromethane loses the effect of the combination. By the use of a larger amount of epoxyethane compound the inhibiting effect will depend only upon such compound and the synergistic effect by the combined use with nitromethane will disappear. Nitromethane exhibits no adverse effect on the composition of the invention when used in the range of amounts recommended according to the invention.

The chlorofluoroalkanes to be used in the invention include trichlorofluoromethane, 1,1,2-trichloro-1,2,2-trifluoroethane, 1,1,1-trichloro-2,2,2-trifluoroethane, tetrachloro-1,2-difluoroethane and tetrachloro-2,2,-difluoroethane. Among these compounds trichlorofluoromethane is most widely used. Said chlorofluoroalkane is used as a propellant for aerosol, and also as a solvent for cleaning by being mixed with hydrated alcohol. When used as a propellant this compound is mostly used in a mixture with other propellants such as dichlorodifluoromethane, dichlorotetrafluoroethane, monochlorodifluoromethane, 1,1-difluoroethane, propane, butane, etc.

The hydrated alcohol used in the invention consists of 85–95 volume percent of an aliphatic alcohol having 1–4 carbon atoms such as methanol, ethanol, propanol, isopropanol, etc., and 5 to 15 volume percent of water. Said hydrated alcohol is used as a solvent for both aerosol and cleaning applications, of these alcohols, 95 volume percent ethanol is most desirable for the applications in question.

The epoxyethane compound and nitromethane to be used in the invention are both soluble in chlorofluoroalkanes and hydrated alcohols. The epoxyethane compound or a mixture of epoxyethane compound and nitromethane can be added to the chlorofluoroalkane or the hydrated alcohol or to a composition containing one or both of the chlorofluoroalkane and the hydrated alcohol.

Now for a better understanding of the invention, the examples of the invention are tabulated in Table 1 below. In the table the results of tests performed to determine the inhibiting effect of the inhibitors of the present invention are shown.

TABLE 1

| Sample No. | Inhibitor | Wt. percent | Cl⁻ (p.p.m.) | pH | Odor | Corrosion |
|---|---|---|---|---|---|---|
| 1-a | 2-methyl-1,2-epoxyethane | 0.01 | 230 | 2.3 | Pungent | Severe. |
| 1-b | do | 0.05 | 100 | 2.8 | Slightly pungent. | Moderate. |
| 1-c | do | 0.1 | 75 | 3.0 | No change | Slight. |
| 1-d | do | 0.5 | 14 | 4.3 | do | No change. |
| 1-e | do | 1.0 | 10 | 4.4 | do | Do. |
| 1-f | do | 3.0 | 5 | 5.0 | do | Do. |
| 1-g | do | 7.0 | 5 | 5.0 | do | Do. |
| 2-a | Epoxyethane | 0.01 | 240 | 2.3 | Pungent | Severe. |
| 2-b | do | 0.05 | 110 | 2.8 | Slightly pungent. | Moderate. |
| 2-c | do | 0.1 | 80 | 3.1 | No change | Slight. |
| 2-d | do | 1.0 | 40 | 3.4 | do | No change. |
| 2-e | do | 3.0 | 32 | 3.7 | do | Do. |
| 3-a | 2-vinyl-1,2-epoxyethane | 0.01 | 180 | 2.1 | Pungent | Severe. |
| 3-b | do | 0.05 | 90 | 3.0 | No change | Slight. |
| 3-c | do | 0.10 | 60 | 3.2 | do | No change. |
| 3-d | do | 0.5 | 8 | 4.7 | do | Do. |
| 3-e | do | 1.0 | 6 | 4.8 | do | Do. |
| 4-a | 2-vinyl-2-methyl-1,2-epoxyethane. | 0.01 | 240 | 2.3 | Pungent. | Severe. |
| 4-b | do | 0.05 | 120 | 2.7 | Slightly pungent. | Moderate. |
| 4-c | do | 0.1 | 85 | 3.0 | No change | Slight. |
| 4-d | do | 0.5 | 22 | 3.9 | do | No change. |
| 4-e | do | 1.0 | 15 | 4.3 | do | Do. |
| 5-a | 2-methyl-1,2-epoxyethane Nitromethane | 0.10 / 0.05 | 21 | 4.0 | do | Do. |
| 5-b | 2-methyl-1,2-epoxyethane Nitromethane | 0.50 / 0.05 | 5 | 5.0 | do | Do. |
| 5-c | 2-methyl-1,2-epoxyethane Nitromethane | 3.00 / 0.05 | 5 | 5.0 | do | Do. |
| 5-d | 2-methyl-1,2-epoxyethane Nitromethane | 0.10 / 0.10 | 10 | 4.5 | do | Do. |
| 5-e | 2-methyl-1,2-epoxyethane Nitromethane | 0.50 / 0.10 | 5 | 5.0 | do | Do. |
| 5-f | 2-methyl-1,2-epoxyethane Nitromethane | 3.00 / 0.10 | 5 | 5.0 | do | Do. |
| 6-a | do | 0.05 | 100 | 2.8 | Pungent | Severe. |
| Control | | | 251 | 2.2 | do | Do. |

Note.—Wt. percent of the inhibitor based on the weight of trichlorofluoromethane.

In a 200 ml. tin-plated aerosol container 50 g. of 95 volume percent ethanol, and 50 g. of trichlorofluoromethane were placed and to such mixture a prescribed amount of the inhibitor shown in the table was added, then the container was sealed airtight and shaken to mix the contents thoroughly. The aerosol container thus prepared was kept in a room maintained at 60° C. for 4 weeks, after which the concentration of chlorine ion, pH, the odor of the solution and the condition of corrosion of the container were examined. The concentration of chlorine ion was sought by first cooling the container maintained at 60° C. to room temperature, then transferring the contents to a beaker, heating such contents at 40° C. to let the contained chlorofluoroalkane vaporize, and after diluting the residue with an equivalent amount of water, titrating the thus diluted solution with silver nitrate solution. The pH value was determined by measuring the hydrogen ion concentration of said diluted solution with a Beckman pH meter.

Other examples are given in Table 2 and Table 3 below, in which compositions were prepared by the same manner as the examples in Table 1 above except that 90 volume percent ethanol in Table 2 and 85 volume percent ethanol in Table 3 were used, respectively, in place of 95 volume percent ethanol and the same tests were performed.

TABLE 2

| Sample No. | Inhibitor | Wt. percent | Cl- (p.p.m.) | pH | Odor | Corrosion |
|---|---|---|---|---|---|---|
| 7-a | 2-methyl-1,2-epoxyethane | 0.1 | 80 | 3.0 | No change | No change. |
| 7-b | do | 0.5 | 40 | 3.5 | do | Do. |
| 7-c | do | 1.0 | 25 | 3.8 | do | Do. |
| 7-d | do | 3.0 | 14 | 4.3 | do | Do.: |
| 8-a | Epoxyethane | 0.05 | 150 | 2.6 | Pungent | Moderate. |
| 8-b | do | 0.2 | 80 | 3.0 | No change | Slight. |
| 8-c | do | 0.5 | 52 | 3.3 | do | No change. |
| 8-d | do | 1.0 | 40 | 3.5 | do | Do. |
| 8-e | do | 3.0 | 20 | 4.0 | do | Do. |
| 9-a | 2-vinyl-1,2-epoxyethane | 0.1 | 70 | 3.1 | do | Do. |
| 9-b | do | 0.5 | 30 | 3.7 | do | Do. |
| 9-c | do | 1.0 | 20 | 4.0 | do | Do. |
| 9-d | do | 3.0 | 11 | 4.4 | do | Do. |
| 10-a | 2-vinyl-2-methyl-1,2-epoxyethane | 0.05 | 200 | 2.4 | Pungent | Severe. |
| 10-b | do | 0.2 | 95 | 2.8 | No change | Slight. |
| 10-c | do | 0.5 | 60 | 3.2 | do | No change. |
| 10-d | do | 1.0 | 46 | 3.4 | do | Do. |
| 10-e | do | 3.0 | 25 | 3.8 | do | Do. |
| 11-a | 2-methyl-1,2-epoxyethane / Nitromethane | 0.10 / 0.05 | 80 | 3.0 | do | Slight. |
| 11-b | 2-methyl-1,2-epoxyethane / Nitromethane | 0.50 / 0.05 | 40 | 3.5 | do | No change. |
| 11-c | 2-methyl-1,2-epoxyethane / Nitromethane | 1.00 / 0.05 | 26 | 3.8 |  | Do. |
| 11-d | 2-methyl-1,2-epoxyethane / Nitromethane | 3.00 / 0.05 | 18 | 4.1 | do | Do. |
| 11-e | 2-methyl-1,2-epoxyethane / Nitromethane | 0.10 / 0.10 | 60 | 3.2 | do | Do. |
| 11-f | 2-methyl-1,2-epoxyethane / Nitromethane | 0.50 / 0.10 | 30 | 3.7 | do | Do. |
| 11-g | 2-methyl-1,2-epoxyethane / Nitromethane | 1.00 / 0.10 | 20 | 4.0 | do | Do. |
| 11-h | 2-methyl-1,2-epoxyethane / Nitromethane | 3.00 / 0.10 | 15 | 4.3 | do | Do. |
| 12-a | do | 0.05 | 380 | 1.9 | Pungent | Severe. |
| 12-b | do | 0.10 | 300 | 2.1 | do | Do. |
| Control |  |  | 500 | 1.7 | do | Very severe. |

TABLE 3

| Sample No. | Inhibitor | Wt. percent | Cl- (p.p.m.) | pH | Odor | Corrosion |
|---|---|---|---|---|---|---|
| 13-a | 2-methyl-1,2-epoxyethane | 0.5 | 100 | 2.8 | No change | Slight. |
| 13-b | do | 1.0 | 80 | 3.0 | do | No change. |
| 13-c | do | 3.0 | 75 | 3.3 | do | Do. |
| 14-a | 2-vinyl-1,2-epoxyethane | 0.5 | 90 | 2.9 | do | Slight. |
| 14-b | do | 1.0 | 75 | 3.0 | do | No change. |
| 14-c | do | 2.0 | 70 | 3.1 | do | Do. |
| 15-a | 2-methyl-1,2-epoxyethane / Nitromethane | 0.05 / 0.05 | 280 | 2.2 | Pungent | Severe. |
| 15-b | 2-methyl-1,2-epoxyethane / Nitromethane | 0.50 / 0.05 | 63 | 2.9 | No change | No change. |
| 15-c | 2-methyl-1,2-epoxyethane / Nitromethane | 3.00 / 0.05 | 42 | 3.5 | do | Do. |
| 15-d | 2-methyl-1,2-epoxyethane / Nitromethane | 0.50 / 0.10 | 60 | 3.0 | do | Do. |
| 16-a | do | 0.05 | 1,000 | 1.2 | Pungent | Very severe. |
| 16-b | do | 0.1 | 800 | 1.4 | do | Do. |
| Control |  |  | 1,030 | 1.2 | do | Do. |

What I claim is:

1. A composition stable to 85 to 95 volume percent hydrated alcohol having 1 to 4 carbon atoms which comprises a chlorofluoroalkane of the group consisting of trichlorofluoromethane, trichlorotrifluoroethanes and tetrachlorodifluoroethanes and 0.1 to 5.0 weight percent of an epoxyethane compound of the group consisting of epoxyethane, 2-methyl-1,2-epoxyethane, 2-vinyl-1,2-epoxyethane and 2-methyl-2-vinyl-1,2-epoxyethane.

2. A composition according to claim 1, in which said chlorofluoroalkane is trichlorofluoromethane.

3. A composition according to claim 1, in which said epoxyethane compound is 2-methyl-1,2-epoxyethane.

4. A composition according to claim 1, in which said epoxyethane compound is present in the amount of 0.5 to 3.0 weight percent, based on the weight of said chlorofluoroalkane.

5. A composition according to claim 1, which contains 0.1 to 2.0 weight percent of said epoxyethane compound and 0.01 to 0.1 weight percent of nitromethane, respectively, based on the weight of said chlorofluoroalkane.

6. A composition according to claim 5, in which said epoxyethane compound is 2-methyl-1,2-epoxyethane.

7. A composition according to claim 5, in which said epoxyethane compound is present in the amount of 0.5 to 1.5 weight percent and said nitromethane is present in the amount of 0.03 to 0.08 weight percent, respectively, based on the weight of said chlorofluoroalkane.

References Cited

UNITED STATES PATENTS

| 3,085,116 | 4/1963 | Kualnes et al. | 260—652.5 |
| 3,265,747 | 8/1966 | Cormany | 260—652.5 |

LEON ZITVER, *Primary Examiner.*

M. M. JACOB, *Assistant Examiner.*

U.S. Cl. X.R.

53—6; 252—170